(12) United States Patent
Ramakrishnan (10) Patent No.: US 8,705,614 B2
(45) Date of Patent: Apr. 22, 2014

(54) MOTION ESTIMATION USING CAMERA TRACKING MOVEMENTS

(75) Inventor: Lakshmanan Ramakrishnan, Bangalore (IN)

(73) Assignee: Broadcom Corporation, Irvine, CA (US)

(*) Notice: Subject to any disclaimer, the term of this patent is extended or adjusted under 35 U.S.C. 154(b) by 2145 days.

(21) Appl. No.: 11/135,941

(22) Filed: May 24, 2005

(65) Prior Publication Data

US 2006/0222072 A1  Oct. 5, 2006

Related U.S. Application Data (60) Provisional application No. 60/667,950, filed on Apr. 4, 2005.

(51) Int. Cl.
| | |
|---|---|
| *H04N 11/02* | (2006.01) |
| *H04N 11/04* | (2006.01) |
| *H04N 7/12* | (2006.01) |
| *H04B 1/66* | (2006.01) |
| *H04N 7/36* | (2006.01) |

(52) U.S. Cl.
CPC .............................. *H04N 19/00593* (2013.01)
USPC ................................................... 375/240.01

(58) Field of Classification Search
None
See application file for complete search history.

(56) References Cited

U.S. PATENT DOCUMENTS

| | | | | | |
|---|---|---|---|---|---|
| 5,473,379 | A | * | 12/1995 | Horne | 375/240.16 |
| 5,502,482 | A | * | 3/1996 | Graham | 348/140 |
| 5,835,138 | A | * | 11/1998 | Kondo | 348/207.99 |
| 6,278,736 | B1 | * | 8/2001 | De Haan et al. | 375/240.16 |
| 6,310,920 | B1 | * | 10/2001 | Ogawa | 375/240.17 |
| 6,529,613 | B1 | * | 3/2003 | Astle | 382/103 |
| 6,580,812 | B1 | * | 6/2003 | Harrington | 382/107 |
| 6,738,099 | B2 | * | 5/2004 | Osberger | 348/699 |
| 6,809,758 | B1 | * | 10/2004 | Jones | 348/208.99 |
| 6,928,232 | B2 | * | 8/2005 | Hibi et al. | 386/241 |
| 6,993,158 | B2 | * | 1/2006 | Cho et al. | 382/103 |
| 7,382,400 | B2 | * | 6/2008 | Sablak | 348/208.99 |
| 7,457,438 | B2 | * | 11/2008 | Nair | 382/107 |
| 7,755,667 | B2 | * | 7/2010 | Rabbani et al. | 348/208.6 |
| 7,817,722 | B2 | * | 10/2010 | Chang et al. | 375/240.25 |
| 8,120,661 | B2 | * | 2/2012 | Rabinowitz et al. | 348/208.6 |
| 8,265,158 | B2 | * | 9/2012 | Rossignol et al. | 375/240.16 |
| 8,494,306 | B2 | * | 7/2013 | Sorek et al. | 382/284 |
| 2005/0179784 | A1 | * | 8/2005 | Qi | 348/208.1 |

\* cited by examiner

*Primary Examiner* — Nhon Diep
(74) *Attorney, Agent, or Firm* — Foley & Lardner LLP (57) ABSTRACT

Presented herein are system(s) and method(s) for motion estimation using camera movements. In one embodiment, there is presented a video camera system for providing video data. The video camera system comprises a video camera, and a circuit. The video camera captures video data. The circuit records information that indicates tracking movements of the video camera.

20 Claims, 7 Drawing Sheets

MOTION ESTIMATION USING CAMERA TRACKING MOVEMENTS

RELATED APPLICATIONS

This application claims priority to "Motion Estimation Using Camera Tracking Movements", U.S. Provisional Patent Application, Ser. No. 60/667,950, filed Apr. 4, 2005, by Lakshmanan Ramakrishnan, which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video encoding standards such as MPEG-2, ITU-H.264 (also known as MPEG-4, Part 10 and Advanced Video Coding) use motion compensation for compressing video data comprising a series of pictures. Motion compensation predicts a predicted picture from one or more reference pictures.

An encoder predicts a predicted picture by dividing the picture into smaller blocks of pixels. The encoder then searches pixels from the reference picture(s) for a similar block, known as a reference block. An identification of the reference block and the difference between the reference block and the predicted block, known as the prediction error, represent the predicted block.

Identification of the similar block in the reference picture is known as motion estimation. A memory stores the reference picture. The motion estimator searches the memory for a block that is similar to the reference block.

Motion estimation can potentially use a very large number of memory accesses for determining a reference picture. A high definition television (HDTV) video comprises 30 1920× 1080 pixel picture per second. A common block size can be, for example, a 16×16 block of pixels, Therefore, an exhaustive search may not be practical, especially for encoding in real time.

In one approach, the encoder may take a smaller number of samples of the block that are preferably sparsely scattered about the block. The motion estimator can then search the reference picture for the samples of the block. Although the foregoing may be faster than an exhaustive search, this can also be time-consuming and computationally intense.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein are system(s) and method(s) for motion estimation using camera movements.

In one embodiment, there is presented a video camera system for providing video data. The video camera system comprises a video camera, and a circuit. The video camera captures video data. The circuit records information indicating tracking movements of the video camera.

In another embodiment, there is presented a method for providing video data. The method comprises moving a video camera capturing video data; recording information indicating tracking movements of the video camera like pan, zoom; and associating portions of the information indicating movements of the video camera that indicate the movements of the video camera during a particular time period, with portions of the video data that are captured during the particular time period.

In another embodiment, there is presented a video encoder for encoding video data. The video encoder comprises memory and a motion estimator. The memory stores reference pictures. The motion estimator predicts at least some portions of a picture from the reference pictures based on information indicating video camera movements between capturing the picture and the reference pictures.

These and other advantages, aspects and novel features of the present invention, as well as details of illustrative aspects thereof, will be more fully understood from the following description and drawings.

DETAILED DESCRIPTION OF THE INVENTION

Figure 1A:
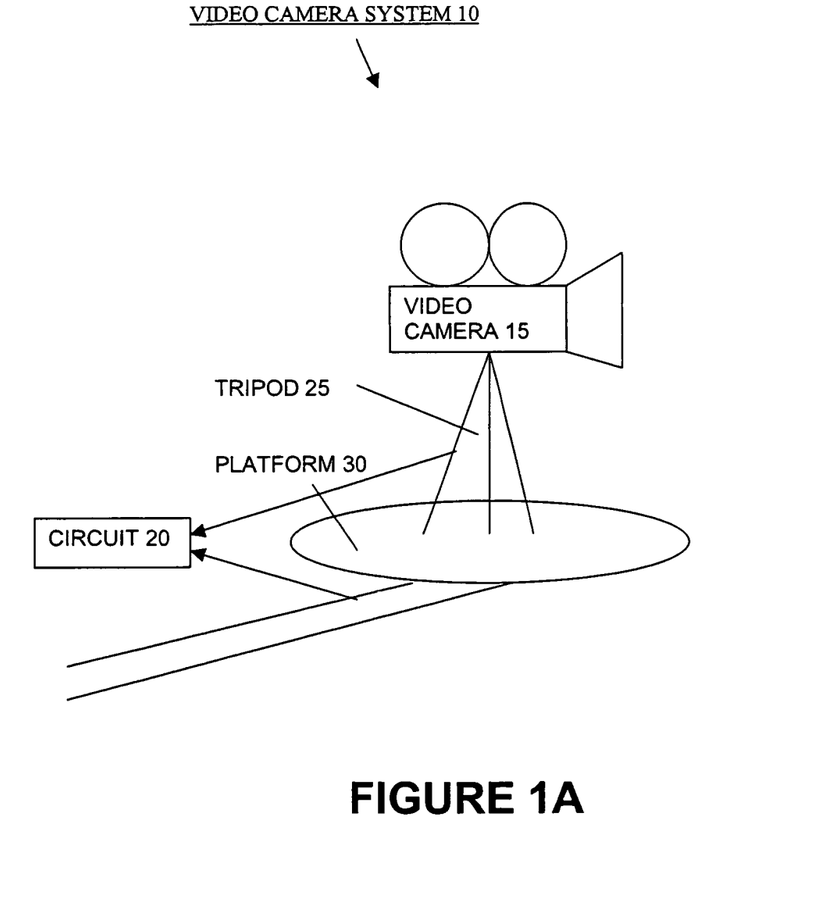
FIG. 1A is a block diagram of an exemplary video camera system in accordance with an embodiment of the present invention.

Referring now to FIG. 1A, there is illustrated a block diagram of exemplary video camera system 10 in accordance with an embodiment of the present invention. The video camera system 10 comprises a video camera 15, and a circuit 20. The video camera 15 captures video data. The circuit 20 records information indicating the tracking movement of the video camera 15.

It is noted that in many motion pictures, and live events, video cameras 15 are mounted on tripods 25 and platforms 30. The platforms 30 move the video cameras 15 from one location to another location, while the tripods 25 allow the video camera 15 to rotationally move. The platform 30 and the tripod 25 are often used to move the video camera 15 to track a moving object. The moving object can include, for example, a person walking or running. In some cases, it may be desirable for the moving object to remain towards the center of the video picture. Tracking the moving object allows the object to remain towards the center of the video picture, even though the object is moving. However, while the object is moving, it is likely that the background remains stationary. Thus, moving the video camera 15 will cause the stationary background to traverse the video picture in the opposite direction of the movement of the video camera 15.

The circuit 20 records the tracking movements of the video camera. According to certain aspects of the present invention, the information can comprise vectors. The video data comprises a series of frames that are captured at a corresponding series of time periods. Each frame can be associated with portions of the tracking movement information that describes the tracking movement of the video camera 15 during the time period that the frame is captured. A port can transmit the video data and the information describing the tracking movement of the video camera to other devices.

Figure 1B:
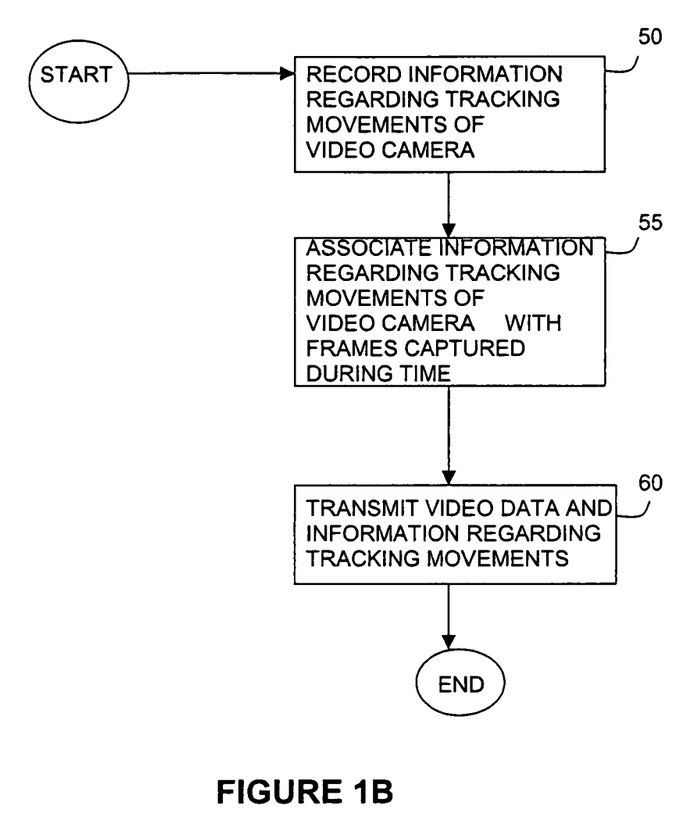
FIG. 1B is a flow diagram describing the operation of the video camera system in accordance with an embodiment of the present invention.

For example, the port can transmit the video data and information describing the tracking movement of the video camera to a video encoder. Many standards for encoding and compressing video data use motion compensation to compress video data. The information indicating tracking movement of the video camera can be used to facilitate motion compensation. Referring now to FIG. 1B, there is illustrated a flow diagram for providing video data in accordance with an embodiment of the present invention. At 50, information is recorded that indicates tracking movements of the video camera. The tracking movements of the video camera can comprise both spatial tracking movements, as well as rotational tracking movements. According to certain aspects of the invention, the information can comprise, for example, vectors.

At 55 portions of the tracking information indicating tracking movements of the video camera that indicate the tracking movements of the video camera during a particular time period are associated with portions of the video data that are captured during the particular time period.

The video data comprises a series of frames. The series of frames are associated with a corresponding series of time periods. Each of the series of frames are associated with particular portions of the tracking movement information, wherein the particular portions of the tracking movement information that are associated with the frames describe the tracking movement of the video camera during the time period associated with the frame.

At 60, the video data and the information indicating the tracking movements are transmitted. According to certain aspects of the invention, the video data and information indicating the tracking movements of the video camera can be transmitted to a video encoder.

An exemplary compression standard, H.264, will now be described by way of example to illustrate how representative embodiments of the invention can facilitate motion compensation. Although the H.264 standard is described, the present invention is not limited to the H.264 standard and can be used with other standards as well.

H.264 Standard

Figure 2:
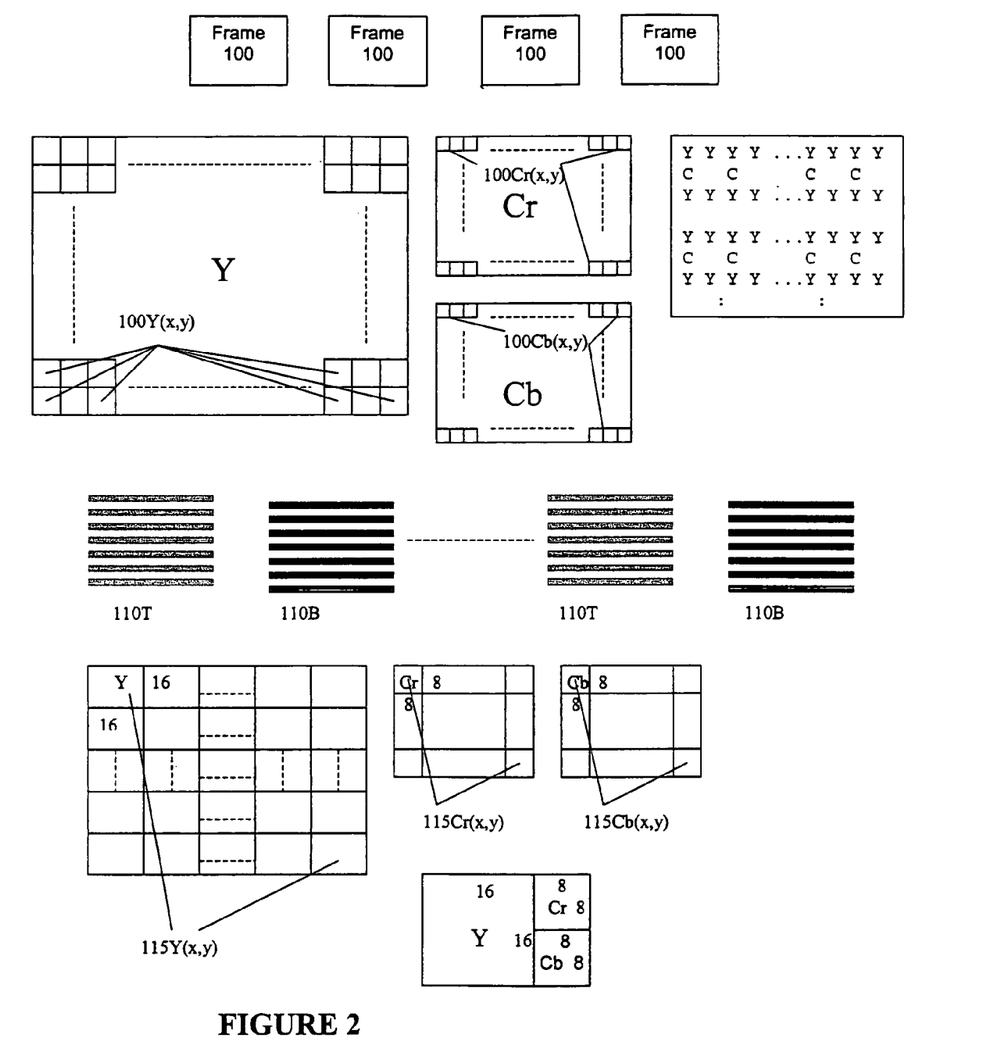
FIG. 2 is a block diagram describing compression of video data.

Referring now to FIG. 2, there is illustrated a block diagram of a frame 100. A video camera captures frames 100 from a field of view during time periods known as frame durations. The successive frames 100 form a video sequence. A frame 100 comprises two-dimensional grid(s) of pixels 100(x,y). For color video, each color component is associated with a two-dimensional grid of pixels. For example, a video can include a luma, chroma red, and chroma blue components. Accordingly, the luma, chroma red, and chroma blue components are associated with a two-dimensional grid of pixels 100Y(x,y), 100Cr(x,y), and 100Cb(x,y), respectively. When the grids of two dimensional pixels 100Y(x,y), 100Cr(x,y), and 100Cb(x,y) from the frame are overlayed on a display device 110, the result is a picture of the field of view at the frame duration that the frame was captured.

Generally, the human eye is more perceptive to the luma characteristics of video, compared to the chroma red and chroma blue characteristics. Accordingly, there are more pixels in the grid of luma pixels 100Y(x,y) compared to the grids of chroma red 100Cr(x,y) and chroma blue 100Cb(x,y). In the MPEG 4:2:0 standard, the grids of chroma red 100Cr(x,y) and chroma blue pixels 100Cb(x,y) have half as many pixels as the grid of luma pixels 100Y(x,y) in each direction.

The chroma red 100Cr(x,y) and chroma blue 100Cb(x,y) pixels are overlayed the luma pixels in each even-numbered column 100Y(x, 2y) between each even, one-half a pixel below each even-numbered line 100Y(2x, y). In other words, the chroma red and chroma blue pixels 100Cr(x,y) and 100Cb(x,y) are overlayed pixels 100Y(2x+½, 2y).

Luma pixels of the frame 100Y(x,y), or top/bottom fields 110YT/B(x,y) can be divided into 16×16 pixel 100Y (16x→16x+15, 16y→16y+15) blocks 115Y(x,y). For each block of luma pixels 115Y(x,y), there is a corresponding 8×8 block of chroma red pixels 115Cr(x,y) and chroma blue pixels 115Cb(x,y) comprising the chroma red and chroma blue pixels that are to be overlayed the block of luma pixels 115Y(x,y). A block of luma pixels 115Y(x,y), and the corresponding blocks of chroma red pixels 115Cr(x,y) and chroma blue pixels 115Cb(x,y) are collectively known as a macroblock 120. The macroblocks 120 can be grouped into groups known as slice groups.

The ITU-H.264 Standard (H.264), also known as MPEG-4, Part 10, and Advanced Video Coding, encodes video on a picture by picture 100 basis, and encodes pictures on a macroblock 120 by macroblock 120 basis. H.264 specifies the use of spatial prediction, temporal prediction, and transformations, quantization and scanning for compressing video data.

Spatial Prediction

Figure 3A:
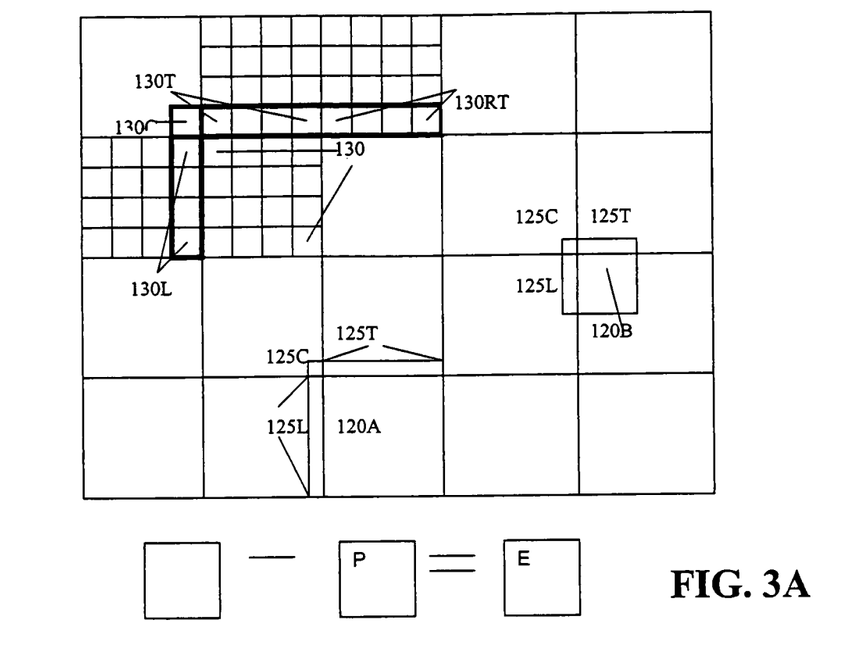
FIG. 3A is a block diagram describing spatial prediction.

Referring now to FIG. 3A, there is illustrated a block diagram describing spatially encoded macroblocks 120. Spatial prediction, also referred to as intraprediction, involves prediction of frame pixels from neighboring pixels. The pixels of a macroblock 120 can be predicted, either in a 16×16 mode, an 8×8 mode, or a 4×4 mode.

In the 16×16 and 8×8 modes, e.g, macroblock 120a, and 120b, respectively, the pixels of the macroblock are predicted from a combination of left edge pixels 125L, a corner pixel 125C, and top edge pixels 125T. The difference between the macroblock 120a and prediction pixels P is known as the prediction error E. The prediction error E is calculated and encoded along with an identification of the prediction pixels P and prediction mode, as will be described.

In the 4×4 mode, the macroblock 120c is divided into 4×4 partitions 130. The 4×4 partitions 130 of the macroblock 120a are predicted from a combination of left edge partitions 130L, a corner partition 130C, right edge partitions 130R, and top right partitions 130TR. The difference between the macroblock 120a and prediction pixels P is known as the prediction error E. The prediction error E is calculated and encoded along with an identification of the prediction pixels and prediction mode, as will be described. A macroblock 120 is encoded as the combination of the prediction errors E representing its partitions 130.

Temporal Prediction

Figure 3B:
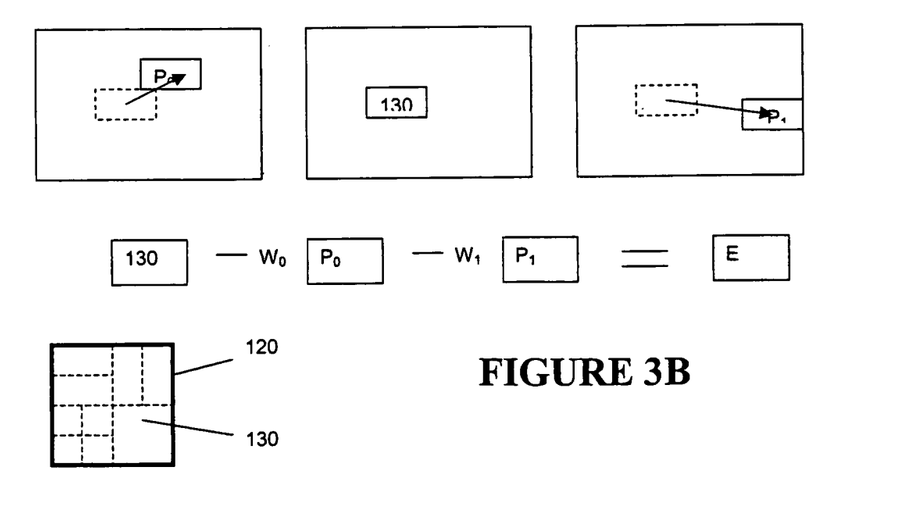
FIG. 3B is a block diagram describing temporal prediction.

Referring now to FIG. 3B, there is illustrated a block diagram describing temporally encoded macroblocks 120. The temporally encoded macroblocks 120 can be divided into 16×8, 8×16, 8×8, 4×8, 8×4, and 4×4 partitions 130. Each partition 130 of a macroblock 120, is compared to the pixels of other frames or fields for a similar block of pixels P. A macroblock 120 is encoded as the combination of the prediction errors E representing its partitions 130.

The similar block of pixels is known as the prediction pixels P. The difference between the partition 130 and the prediction pixels P is known as the prediction error E. The prediction error E is calculated and encoded, along with an identification of the prediction pixels P. The prediction pixels P are identified by motion vectors MV. Motion vectors MV describe the spatial displacement between the partition 130 and the prediction pixels P. The motion vectors MV can, themselves, be predicted from neighboring partitions.

The partition can also be predicted from blocks of pixels P in more than one field/frame. In bi-directional coding, the partition 130 can be predicted from two weighted blocks of pixels, $P_0$ and $P_1$. Accordingly, a prediction error E is calculated as the difference between the weighted average of the prediction blocks $w_0P_0+w_1P_1$ and the partition 130. The prediction error E and an identification of the prediction blocks $P_0$, $P_1$ are encoded. The prediction blocks $P_0$ and $P_1$ are identified by motion vectors MV.

The weights $w_0$, $w_1$ can also be encoded explicitly, or implied from an identification of the field/frame containing the prediction blocks $P_0$ and $P_1$. The weights $w_0$, $w_1$ can be implied from the distance between the frames/fields containing the prediction blocks $P_0$ and $P_1$ and the frame/field containing the partition 130. Where $T_0$ is the number of frame/field durations between the frame/field containing $P_0$ and the frame/field containing the partition, and $T_1$ is the number of frame/field durations for $P_1$, $$w_0=1-T_0/(T_0+T_1)$$

$$w_1=1-T_1/(T_0+T_1)$$

Transformations

Figure 3C:
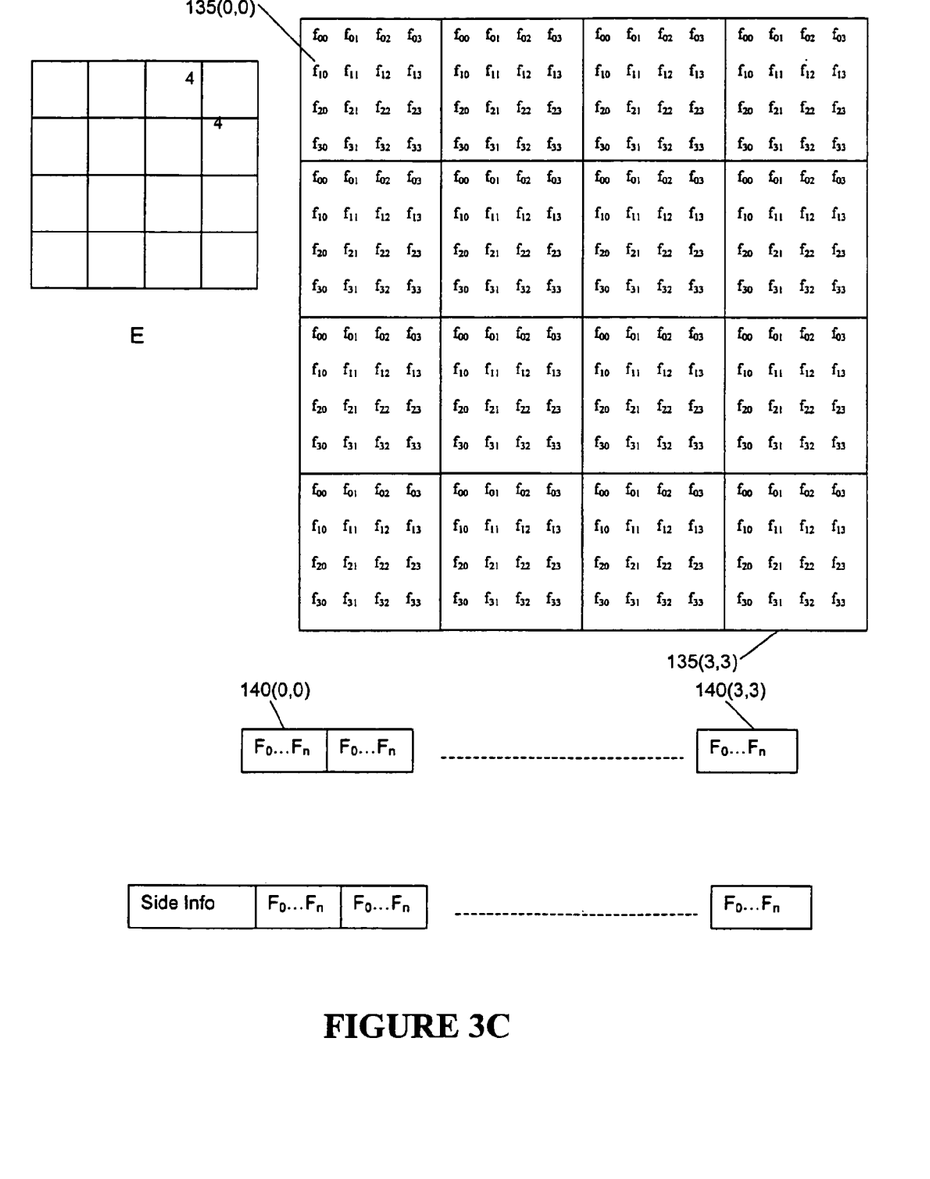
FIG. 3C is a block diagram describing transformation of a macroblock into the frequency domain.

Referring now to FIG. 3C, there is illustrated a block diagram describing the encoding of the prediction error E. With both spatial prediction and temporal prediction, the macroblock 120 is represented by a prediction error E. The prediction error E is also two-dimensional grid of pixel values for the luma Y, chroma red Cr, and chroma blue Cb components with the same dimensions as the macroblock 120. Transformations transform 4×4 partitions 130(0,0) . . . 130(3,3) of the prediction error E to the frequency domain, thereby resulting in corresponding sets 135(0,0) . . . 135(3,3) of frequency coefficients $f_{00}$ . . . $f_{33}$.

The sets of frequency coefficients are then quantized and scanned, resulting in sets 140(0,0) . . . 140(3,3) of quantized frequency coefficients, $F_0$ . . . $F_n$. A macroblock 120 is encoded as the combination of its partitions 130.

Motion Estimation Using Tracking Movement Information

The process of locating the prediction pixels is known as motion estimation. Motion estimation can potentially use a very large number of memory accesses for determining a reference picture. For example, a high definition television (HDTV) video comprises 30 1920×1080 pixel picture per second, for example. Therefore, an exhaustive search may not be practical, especially for encoding in real time.

However, where the frames in the input data are associated with tracking movement information that describes the tracking movement of the video camera 15 during the time period that the frame is captured, a video encoder can use the tracking movement information to locate the prediction pixels. The video encoder can use the tracking movement information to determine which pixels to start examining in the reference frame.

Figure 4:
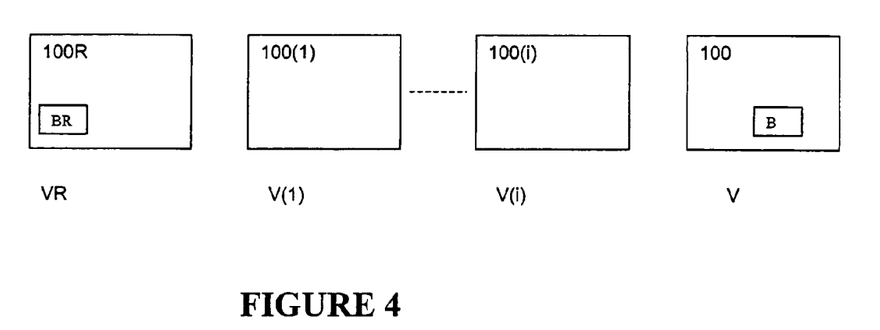
FIG. 4 is a block diagram describing motion estimation in accordance with an embodiment of the present invention.

Referring now to FIG. 4, there is illustrated a block diagram describing motion estimation for a picture 100 from a reference picture 100R in accordance with an embodiment of the present invention. The reference picture 100R may be captured before or after the picture 100 with any number of pictures, 100(1) . . . 100(i), or none at all, captured there between.

Each of the pictures 100, 100(1) . . . 100(i), 100R are associated with tracking movement information, vectors V, V(1) . . . V(i), VR, describing the camera tracking movement during the time period that the picture was captured. The tracking movement of the camera between pictures 100 and 100R can be determined from the vectors V, V(1) . . . V(i), VR.

Where the picture 100 is captured before the reference picture 100R, the vectors V, V(1) . . . V(i), VR can be used to translate a block B from picture 100 to a corresponding block BR in reference picture 100R. The block BR in the reference picture 100R is likely to be a good prediction block P for block B in picture 100. Accordingly, the picture 100 can be examined starting from the block BR.

Where the picture 100 is captured before the reference picture 100R, the inverse of the vectors V, V(1) . . . V(i), VR can be used to translate a block B from picture 100 to a corresponding block BR in reference picture 100R. The block BR in the reference picture 100R is likely to be a good prediction block P for block B in picture 100. Accordingly, the picture 100 can be examined starting from the block BR.

According to certain aspects of the invention, the block BR can be examined, and where found to be a good prediction block, selected as the prediction block P for block B. The motion vectors describing the translation between prediction block P and block B can be the sum of the vectors V, V(1) . . . V(i), VR where the picture precedes the reference picture, or the inverse sum of the vectors V, V(1) . . . V(i), VR where the reference picture precedes the picture.

Additionally, it is possible that the camera movements track an object in the center of the picture to maintain the object in the center. Therefore, where block B is towards center of the picture, the block BR may not necessarily be a good prediction block P. Thus, according the certain aspects of the invention, the foregoing can be limited to blocks B that are away from the center of the picture.

Figure 5:
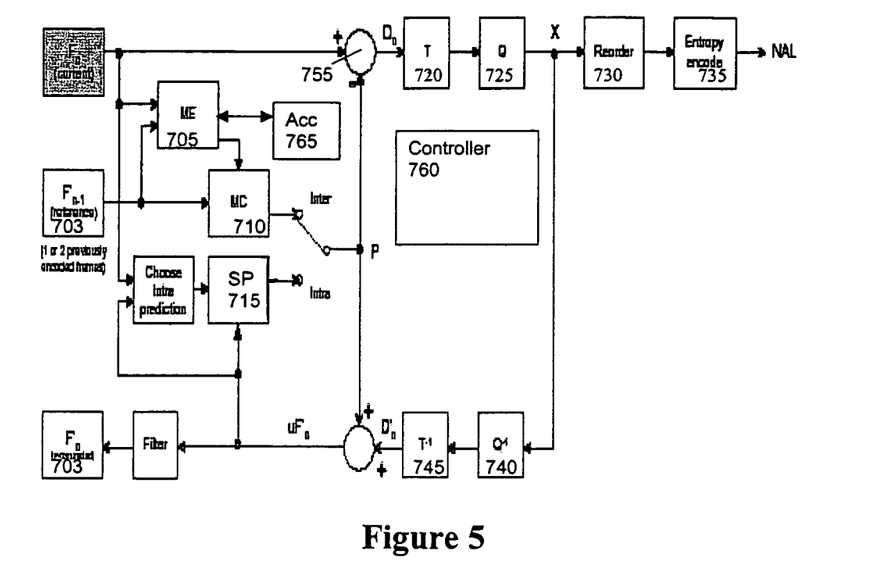
FIG. 5 is a block diagram describing an exemplary video encoder in accordance with an embodiment of the present invention.

Referring now to FIG. 5, there is illustrated a block diagram describing an exemplary video encoder in accordance with an embodiment of the present invention. The video encoder encodes video data comprising a set of pictures $F_0$ . . . $F_n$. The video encoder comprises frame buffers 703, motion estimators 705, motion compensators 710, spatial predictors 715, transformation engine 720, quantizer 725, scanner 730, entropy encoders 735, inverse quantizer 740, and inverse transformation engine 745. The foregoing can comprise hardware accelerator units under the control of a controller 760. The controller 760 can include, for example, a processor.

When an input frame $F_n$ is presented for encoding, the video encoder processes the frame $F_n$ in units of macroblocks. The video encoder can encode each macroblock using either spatial or temporal prediction. In each case, the video encoder forms a prediction block P. In spatial prediction mode, the spatial predictors 715 form the prediction macroblock P from samples of the current frame $F_n$ that was previously encoded. In temporal prediction mode, the motion estimators 705 and motion compensators 710 form a prediction macroblock P from one or more reference frames. Additionally, the motion estimators 705 and motion compensators 710 provide motion vectors identifying the prediction block. The motion vectors can also be predicted from motion vectors of neighboring macroblocks.

A subtractor 755 subtracts the prediction macroblock P from the macroblock in frame $F_n$, resulting in a prediction error E. Transformation engine 720 and quantizer 725 block transform and quantize the prediction error E, resulting in a set of quantized transform coefficients X. The scanner 730 reorders the quantized transform coefficients X. The entropy encoders 735 entropy encode the coefficients.

The video encoder also decodes the quantized transform coefficients X, via inverse transformation engine 745, and inverse quantizer 740, in order to reconstruct the frame $F_n$ for encoding of later macroblocks 120, either within frame $F_n$ or other frames.

According to certain aspects of the invention, the motion estimator 705 can use camera tracking movement information to predict at least some portions of a picture from the reference pictures based on tracking information indicating video camera movements between capturing the picture and the reference pictures. The motion estimator can use the tracking information indicating video camera tracking movements between capturing the picture and the reference pictures, as described above, to determine a portion of the picture that is most likely to have a suitable prediction block P. After determining the portion of the picture that is most likely to have a suitable prediction block P, the motion estimator 705 can access the addresses of the frame buffer 703 storing the portion of the picture.

Additionally, the video encoder can include an accumulator 765 that accumulates the video camera movement information describing the camera tracking movement between capture of a picture, and a reference picture. In a representative embodiment, the motion vector can be determined from the accumulated camera movement information.

The embodiments described herein may be implemented as a board level product, as a single chip, application specific integrated circuit (ASIC), or with varying levels of the decoder system integrated with other portions of the system as separate components.

The degree of integration of the decoder system will primarily be determined by the speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope.

Therefore, it is intended that the present invention not be limited to the particular embodiment disclosed, but that the present invention will include all embodiments falling within the scope of the appended claims.

The invention claimed is:

1. A method for encoding video data comprising:
   storing a reference picture in a memory; and
   predicting at least one portion of a different picture from the reference picture based on information indicating video camera movement between capturing the different picture and the reference picture with a motion estimator, wherein the information indicating the video camera movement is provided by a device that causes the video camera movement, wherein the information provided by the device that causes the video camera movement comprises trajectory data of the video camera.

2. The method of claim 1, wherein the at least one portion of the different picture is comprised of a macroblock.

3. The method of claim 1, wherein the at least one portion of the different picture is not the center of the reference picture.

4. The method of claim 1, further comprising:
   accessing, with the motion estimator, the memory based on the information indicating video camera movement between capturing the different picture and the reference picture.

5. The method of claim 1, further comprising:
   accumulating the information indicating the camera movement between the reference picture and the different picture.

6. The method of claim 1, further comprising:
   determining a memory address for access by the motion estimator, based on the information.

7. A video encoder for encoding video data, said video encoder comprising:
   a memory operable to store a reference picture; and
   a motion estimator operable to predict at least one portion of a different picture from the reference picture based on information indicating video camera movement between capturing the different picture and the reference picture, wherein the information indicating video camera movement comprises trajectory data of the video camera and is provided by a device that is operable to move the video camera with a predetermined direction.

8. The video encoder of claim 7, wherein the at least one portion of the different picture is comprised of a macroblock.

9. The video encoder of claim 7, wherein the at least one portion of the different picture is not the center of the reference picture.

10. The video encoder of claim 7, wherein the motion estimator is operable to access the memory based on the information indicating video camera movement between capturing the different picture and the reference picture.

11. The video encoder of claim 7, further comprising:
    an accumulator operable to accumulate the information indicating the camera movement between the reference picture and the different picture.

12. The video encoder of claim 7, further comprising:
    a controller operable to determine a memory address for access by the motion estimator, based on the information.

13. The video encoder of claim 7, wherein the video encoder further comprises:
    a motion compensator that forms a first prediction macroblock for a portion of the different picture and a motion vector identifying the prediction macroblock;
    a subtractor that subtracts the prediction macroblock from the portion of the different picture to create a prediction error;
    a transformation engine that block transforms the prediction error into a set of transform coefficients;
    a quantizer that converts the set of transform coefficients into a set of quantitized transform coefficients;
    a scanner that reorders the set of quantized transform coefficient; and
    an entropy encoder that entropy encodes the set of quantitized transform coefficients.

14. The video encoder of claim 7, wherein the video encoder further comprises:
    a spatial predictor that forms a prediction macroblock for a portion of the different picture;

a subtractor that subtracts the prediction macroblock from the portion of the different picture to create a prediction error;

a transformation engine that block transforms the prediction error into a set of transform coefficients;

a quantizer that converts the set of transform coefficients into a set of quantitized transform coefficients;

a scanner that reorders the set of quantized transform coefficient; and an entropy encoder that entropy encodes the set of quantitized transform coefficients.

15. An integrated circuit for encoding video data, said integrated circuit comprising:

a memory operable to store a reference picture; and a motion estimator circuit, electrically connected to the memory, operable to predict at least one portion of a different picture from the reference picture based on information indicating video camera movement between capturing the different picture and the reference picture, wherein the information indicating video camera movement comprises trajectory data of the video camera and is provided by a device that is operable to move the video camera with a predetermined direction.

16. The integrated circuit of claim 15, wherein the at least one portion of the different picture is comprised of a macroblock.

17. The integrated circuit of claim 15, wherein the at least one portion of the different picture is not the center of the reference picture.

18. The integrated circuit of claim 15, wherein the motion estimator circuit is operable to access the memory based on the information indicating video camera movement between capturing the different picture and the reference picture.

19. The integrated circuit of claim 15, further comprising:

an accumulator circuit, electrically connected to the memory, operable to accumulate the information indicating the camera movement between the reference picture and the different picture.

20. The integrated circuit of claim 15, further comprising:

a controller operable to determine a memory address for access by the motion estimator circuit, based on the information.

\* \* \* \* \*